United States Patent Office 2,968,760
Patented Jan. 17, 1961

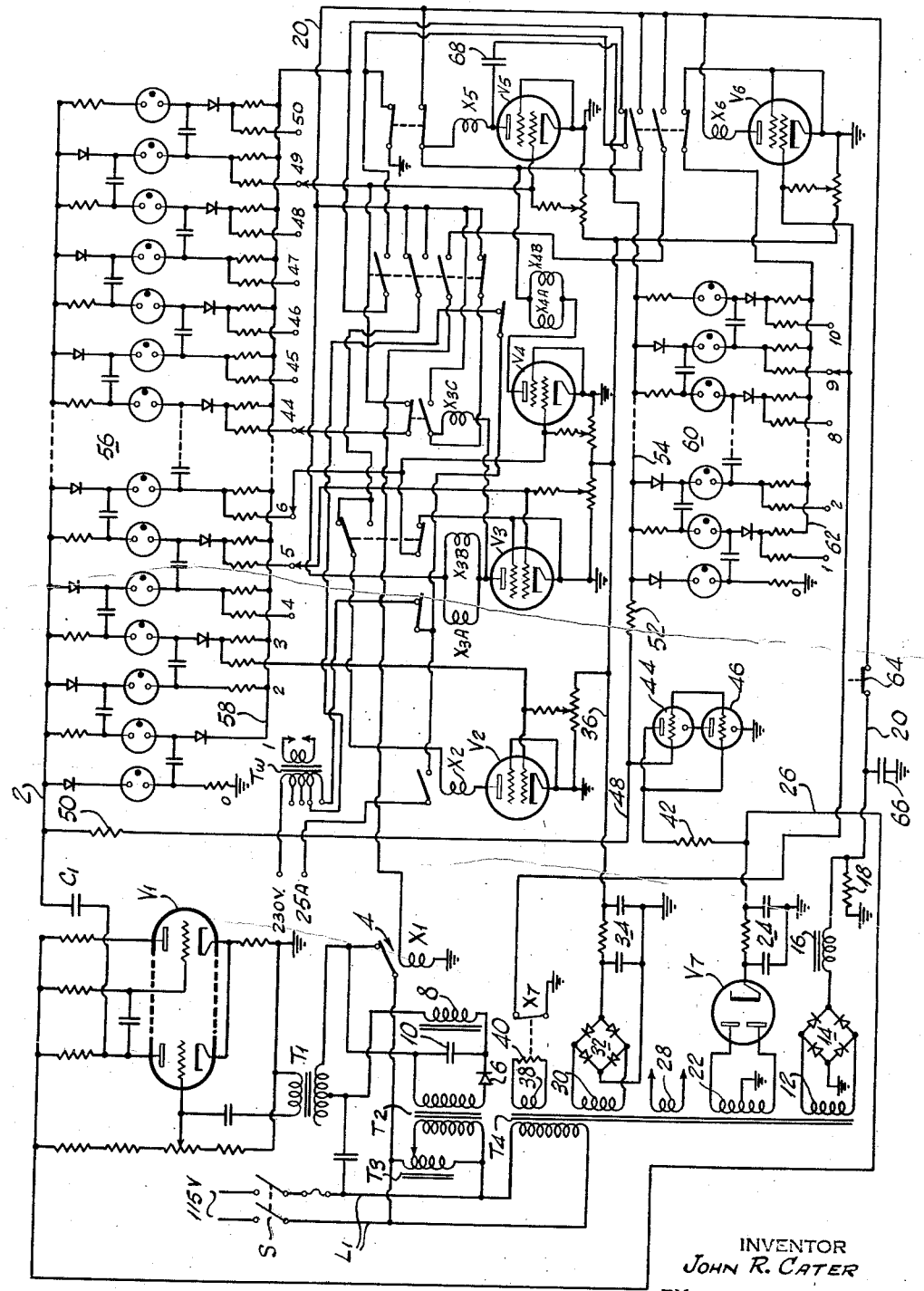

2,968,760
WELDING CONTROL CIRCUIT

John R. Cater, Nutley, N.J., assignor to Tung-Sol Electric Inc., a corporation of Delaware Filed Sept. 17, 1957, Ser. No. 684,588

6 Claims. (Cl. 323—58)

The present invention relates to electric welding and comprises a novel welding control circuit which automatically performs a number of functions. The new control circuit permits the making of one spot or seam weld at one predetermined heat and a predetermined succession of other spot or seam welds at another preset heat. The circuit insures an accurate control of the number of A.C. cycles for each heat, and an accurate control of the number of A.C. cycles during the "off" time between welds. The system automatically locks out at the termination of each completed weld cycle and resets itself for the next weld cycle. Moreover, the new control circuit permits accurate adjustment of each "off" operation to insure that the welding transformer is cut off as the current wave goes through zero.

The control circuit comprises essentially a source of control pulses, the timing or phase of which relative to the phase of the welding current is adjustable, two counting chains, a main counting chain which counts created control pulses and, in response thereto, controls delivery of power to the welding transformer, and a weld counting chain which counts the number of welds and serves to reset the system for the next welding operation after a predetermined number of welds. The system employs a number of thyratron tubes, the firing of which is controlled from the counting chains. Relays in the anode circuits of the thyratrons control application of power to the welding transformer. The control circuit is such that both the application and removal of power to the welding transformer are controlled in response to energization, rather than deenergization, of relays, thus insuring fast and positive control. Each of the counting chains is an open ended chain and comprises a plurality of parallel circuits each containing a resistor, a neon diode and a crystal diode, the separate circuits being capacitatively interconnected to insure sequential operation in response to control pulses. The source of control pulses is a trigger circuit energized from a saturating transformer. The primary of the transformer is provided with biasing direct current and means are provided for varying the biasing current to provide the control of the timing of the pulses created by the trigger circuit.

For a better understanding of the invention reference may be had to the accompanying drawing the single figure of which is a circuit diagram of the presently preferred embodiment of the invention.

In the particular embodiment of the invention diagrammatically illustrated in the figure the source of pulses is a monostable multivibrator or trigger circuit of conventional design including a double triode $V_1$ which is triggered from the secondary of a saturating transformer $T_1$, the trigger circuit delivering negative pulses through a capacitor $C_1$ to a line 2 when alternating current is impressed across the primary of transformer $T_1$. The primary of transformer $T_1$ is connected across power lines $L_1$, which may be 115 v. alternating current supply lines, as indicated, through a switch 4 controlled by a relay $X_1$, the switch being open when relay $X_1$ is energized. An adjustable auto-transformer $T_3$, connected across the lines $L_1$, supplies energy to the primary of a transformer $T_2$, the secondary of which is connected in series with a crystal diode rectifier 6 and an inductance 8 across the primary of transformer $T_1$. A capacitor 10 is connected across the series circuit of the secondary of transformer $T_2$ and rectifier 6. Thus the output of transformer $T_2$ is rectified and applied as direct current bias to the primary of the saturating transformer $T_1$. A tap on the auto-transformer $T_3$ serves for adjustment of the bias current and therefore the timing or phase of the pulses delivered by the trigger circuit to the line 2.

A transformer $T_4$, connected across the lines $L_1$, provides the power for the control system. There are five secondary windings on transformer $T_4$. Winding 12, through a full wave crystal rectifier 14 and filter comprising inductance 16 and resistor 18, supplies high positive potential to a line 20 for application to the anodes of the thyratrons of the system. Secondary winding 22, which is center grounded, is connected at its ends to the anodes of a full wave rectifying tube $V_7$, the cathode of which, through a suitable filter 24, delivers high voltage of the order of 300 v. to a line 26 for energization of the trigger circuit and of the counting circuits to be described. Secondary winding 28 supplies the heater voltage for the heaters of the various tubes of the system. (To avoid complicating the drawing the heaters of the various tubes and their connections to winding 28 have not been illustrated.) Secondary winding 30 of transformer $T_4$ is connected through a full wave crystal rectifier 32 and filter 34 to a line 36 which is maintained thereby at a negative potential of say 50 v. Secondary winding 38 is connected across a heater 40 controlling a thermal switch $X_7$ the purpose of which will become apparent as the description proceeds. The high voltage line 26 is connected through a resistor 42 and a pair of voltage regulator tubes 44 and 46 to a line 48 which is connected through a resistor 50 to the line 2 and through a similar resistor 52 to a line 54.

The main counting chain, indicated generally at 56, in the particular embodiment of the invention illustrated, is of the type described in Manley Patent 2,714,180, dated July 26, 1955. It comprises an array of similar circuits each connected at one end to the line 2. Each circuit of the chain includes a crystal diode, a neon diode and a resistor and each is coupled to the next succeeding circuit of the chain through a capacitor. The first or "zero count" circuit of the chain is grounded at its other end and the remaining circuits of the chain are connected at their other ends to a bus bar 58, the ground connection for which is controlled as hereinafter described. The weld counting chain is indicated generally at 60. Like the main counting chain, each of the parallel circuits of the weld counting chain is connected at one end to the line 54 and at the other end, with the exception of the first or zero weld count circuit, to a bus bar 62, the ground connection for which is controlled as hereinafter described.

The operation of the main and weld counting chains will be understood from the following brief description. Each neon tube in the chain has a higher igniting than operating voltage. When a circuit of the main chain is energized the potential in line 2, due to the potential drop across resistor 50 drops below the ignition voltage. When a negative pulse is impressed upon line 2 through capacitor $C_1$, the current through the previously energized neon tube circuit is extinguished and the charge on the condenser coupling that circuit to the next succeeding circuit dissipates through the crystal diode of such succeeding circuit in the reverse direction. Thus the potential across the neon tube of the next succeeding circuit is greater than that across the other neon tubes of the chain and as a result, as the line potential rises following the negative pulse such succeeding circuit, and only such circuit, will conduct. Similarly, the potential in line 54, when any one of the weld counting chain circuits is energized, is below the ignition voltage of the neon tube due to the potential drop across resistor 52.

The control circuit includes five thyratrons $V_2$, $V_3$, $V_4$, $V_5$, and $V_6$ respectively. The cathode of each of the thyratrons is grounded and each is connected through a separate resistor to the line 36 of negative potential. The control grid of each thyratron is normally negatively biased by connection through a high resistor, of say 1 meg., to a tap on the resistor connected to the cathode of that tube. Thus, in the absence of grounding of the control grid of a thyratron or application of positive potential from a counting chain, that tube will not be rendered conductive.

In the anode circuit of thyratron $V_2$ is a relay winding $X_2$ the armature of which controls, over a front contact, a connection to a source of power for the welding transformer $T_w$. The source may be 230 v. 25 amps. as indicated in the drawing. Thyratron $V_3$ has two parallel connected relay windings $X_3a$ and $X_3b$ in its anode circuit. The armature of relay $X_3a$ controls, over its back contact, a connection to the welding transformer for the first weld pulse. Relay $X_3b$ has two armatures of which one, over a back contact, closes a ground connection for the grid of thyratron $V_4$ and the other in cooperation with jumpered contacts controls the application of operating energy to thyratron $V_2$. A third relay $X_3c$ is connected between the anode of $V_3$ and a back contact of a relay $X_4b$ in the anode circuit of $V_4$. When relay $X_3c$ is energized a stick circuit over a front contact of its armature is closed. Thus this relay picks up only when both $V_3$ and $V_4$ are energized. Over a back contact of a second armature, relay $X_3c$ controls a connection between a circuit of the main counting chain and the control grid of $V_5$. In the anode circuit of thyratron $V_4$ are two parallel relay windings $X_4a$ and $X_4b$. Relay $X_4a$ controls, over a back contact, the tap for the second and succeeding weld pulses. Relay $X_4b$ has four armatures. One armature, over a back contact, completes the pick-up circuit for winding $X_3c$ between the line 20 and the anode of tube $V_3$. A second armature, over a front contact, controls the circuit of relay $X_1$. The third armature, in cooperation with jumpered contacts, controls the anode circuit of thyratron $V_2$ and the fourth armature, over a back contact, partially controls a ground connection for bus bar 58 of the main counting chain.

Thyratron $V_5$ in its anode circuit has a single relay winding $X_5$ one armature of which, over a back contact, closes the energizing circuit for thyratrons $V_4$ and $V_5$ and another armature of which over a back contact completes a ground connection for bus bar 58 through the contacts controlled by relay $X_4b$. Thyratron $V_6$ has a relay $X_6$ in its anode circuit. Relay $X_6$ has four armatures. One armature, over a back contact controls the ground connection for bus bar 62 of the weld counting chain. The second armature, over a front contact, together with contacts controlled by relay $X_4b$, controls the circuit of relay $X_1$. The third armature, over a front contact, controls a separate energizing circuit for thyratron $V_4$ and the fourth armature, over a back contact, provides an alternative control of the ground connection from bus bar 58 to a back contact of an armature of relay $X_5$.

The control grid of thyratron $V_2$, in the particular embodiment of the invention illustrated, is connected through a high resistor, for example, 1 meg., to the high potential end of the resistor in the third counting circuit of the main counting chain so that a positive potential is impressed upon the grid of that tube when such circuit becomes conductive. The control grid of thyratron $V_3$ is similarly connected to the fifth counting circuit of the main counting chain. The control grid of thyratron $V_4$ is similarly connected to the sixth counting circuit of the main counting chain. The control grid of thyratron $V_5$ is similarly connected through a contact controlled by relay $X_3c$ to a subsequent counting circuit of the main counting chain and also to a still higher numbered counting circuit of the main counting chain. Preferably all connections to the circuits of the main counting chain, with the exception of that to the control grid of thyratron $V_2$, are made through taps, as indicated, permitting adjustment of the number of on and off cycles of the welding operation.

In the line 20 supplying operating energy for the various thyratrons, there is a foot switch 64 which is normally closed and is momentarily opened when operated. Switch 64 should be relatively fast acting. A snap action double throw switch, such as a micro switch, with the normally open and normally closed contacts jumpered has been found suitable for use in the system. Between the source and the switch 64 the line 20 is connected to ground through a capacitor 66.

When power is supplied to the above described circuit, as by closure of a switch S in the power lines $L_1$, thyratron $V_6$ is immediately energized because its control grid is grounded through $X_7$ before that switch opens as a result of heat supplied to it from the heater 40. Once that thyratron has fired, the grid loses control so that subsequent opening of $X_7$ does not render the thyratron non-conducting. Thyratron $V_4$ is also immediately energized because its grid is grounded through a back contact of an armature of winding $X_3b$ and its anode circuit is closed over a back contact controlled by relay $X_5$. The remaining thyratrons are biased off by virtue of the negative potential applied to the control grids thereof from line 36. As thyratrons $V_3$ and $V_2$ are not conducting, the connection to the welding transformer for the first weld pulse is closed over a back contact of the armature of relay $X_3a$ but the power connection is open over the front contact controlled by relay $X_2$. As thyratron $V_4$ is energized, the connection to the second and succeeding weld pulse is open at a back contact controlled by relay $X_4a$. Relay $X_1$ is energized over front contacts controlled by relays $X_4b$ and $X_6$. Thus as the alternating current circuit of the primary of transformer $T_1$ is open at switch 4, no pulses are generated by the trigger circuit. Although $V_5$ is not conducting the ground connection for bus bar 58 at the back contact of relay $X_5$ is interrupted as both alternative connections through contacts controlled by armature of relays $X_4b$ and $X_6$ are open. As $V_6$ is conducting the ground connection for bus bar 62 is open at the back contact of an armature of relay $X_6$. The zero count circuits of the two counting chains 56 and 60 are conducting because their ground connections remain closed.

To initiate the welding cycle, the normally closed foot switch 64 is snapped open and shut. This deenergizes thyratrons $V_4$ and $V_6$ and permits the bias on the control grids to regain control. $V_6$ remains deenergized but $V_4$ immediately reenergizes as the ground connection to its grid at the back contact controlled by relay $X_3b$ is closed. Deenergization of $V_6$ closes the ground connections for bus bars 58 and 62 and opens the energizing circuit for relay $X_1$. Energy is thus removed from relay $X_1$ which thereupon permits switch 4 to close the circuit of the primary of transformer $T_1$ with consequent creation of pulses by the trigger circuit. The first negative pulse from the trigger circuit causes deenergization of the zero count circuit of the main counting chain and energization of the first counting circuit of that chain. After two more pulses or cycles, the third counting circuit of the main counting chain is rendered conductive and a triggering potential is delivered to the grid of thyratron $V_2$. The resulting energization of $V_2$ closes the connection to the welding power source and, as $V_3$ is deenergized at this time, power is delivered through the back contact controlled by relay $X_3a$ to the welding transformer $T_w$ for the first weld pulse. Welding then continues until thyratron $V_3$ is fired as a result of a triggering potential applied from the counting chain to the control grid thereof. With the connection shown in the drawing such potential will be delivered two cycles after welding starts. Energization of $V_3$ opens the circuit to the welding transformer over the contact controlled by relay $X_3a$ and momentarily opens the power circuit of $V_2$ over the jumpered contacts controlled by relay $X_3b$. Thyratron $V_2$ therefore deenergizes and remains deenergized, opening the circuit to the power line over the front contact controlled by relay $X_2$. Relay $X_3c$ remains deenergized as its pick-up circuit over a back contact of an armature of relay $X_4b$ is open. Counting continues for a number of off cycles determined by the tap to which the control grid of thyratron $V_5$ is connected over the back contact of the armature of relay $X_3c$. When, as shown, this connection is to the forty-fourth counting circuit of the main counting chain there will be thirty-eight off cycles. When $V_5$ fires it causes opening of the ground connection for the bus bar 58, it causes opening of its own energizing circuit, and also of that of thyratron $V_4$ and it causes a counting pulse to be impressed upon line 54 through a capacitor 63 connected between the anode of $V_5$ and the line 54.

Accordingly the main counting chain is reset to zero and the first counting circuit of the weld counting chain is energized. When bias regains control of thyratrons $V_4$ and $V_5$, $V_4$ does not reenergize as the ground connection for its grid is open at a back contact of energized relay $X_3b$. Relay $X_3c$ becomes energized through closure of its pick-up circuit over a back contact controlled by relay $X_4b$ and remains energized over its stick circuit.

After three more cycles, $V_2$ is again fired closing the circuit to the source of welding power. As $V_4$ is deenergized power is delivered to the welding transformer for the second weld pulse over the back contact controlled by relay $X_4a$, the tap for the first weld pulse being held open over the front contact controlled by relay $X_3a$. Counting of pulses continues until $V_4$ is fired. This opens the circuit for the second weld tap and, over the jumpered contacts controlled by relay $X_4b$, opens the circuit of thyratron $V_2$ to cut off power from the welding circuit. Counting then continues for the number of cycles determined by the tap to which the control grid of $V_5$ is directly connected. With the particular connections shown there will be forty-three off cycles. When $V_5$ fires, a second pulse is delivered to the weld counting chain, the ground connection for the main counting chain is opened to reset that chain and $V_4$ and $V_5$ are deenergized.

The above described operation for the second weld pulse is repeated for the third and succeeding weld pulses. When the desired number of weld pulses have been made, as determined by the tap on the weld counting chain to which the grid of $V_6$ is connected, that thyratron is fired to terminate the operation after one more trip through the main counting chain to $V_4$. Firing of $V_6$ opens the ground connection for line 62 of the weld counting chain and prepares the circuit of relay $X_1$ for closure upon subsequent firing of $V_4$ and opens the alternative ground connection for bus bar 58 of the main counting chain. Thus when $V_4$ is fired during the subsequent excursion through the main counting chain, the circuit of relay $X_1$ is closed to terminate the pulses by opening of switch 4, the ground connection of bus bar 58 is opened to clear the main counting chain, and the entire system is set up for the next welding operation. Such next operation is initiated when foot switch 64 is operated to momentarily open the anode circuits of all of the thyratrons.

From the foregoing description it will be apparent that the invention provides a flexible and automatic welding control circuit that permits of ready adjustment of the number of on and off cycles of the welding current, that provides for one spot weld or seam weld at one heat and a predetermined number of succeeding welds at another preset heat, that provides for a lesser number of off cycles between the first and second weld than between later welds, and that provides for a definite lock out at the termination of each weld cycle and automatic reset for the next weld cycle. The system insures that both application and removal of weld power are controlled by energization of relays, thus providing faster, better and more positive control than is the case when control is by deenergization of relays. The adjustable control of the bias voltage to the saturating transformer of the trigger circuit provides means for so setting the phase relationship between the welding supply voltage and the counting pulses that welding power is turned off as the current wave goes through zero. Contact life of relays $X_3a$ and $X_4a$ is thereby increased and danger of sparking eliminated.

Alternative arrangements for various parts of the specific system illustrated in the drawing will occur to those skilled in the art. For example, although a monostable multi-vibrator or trigger circuit has been shown as the source of pulses for actuation of the main counting chain, other known pulses forming circuits could be employed. Other variations, as for example, other known counting chains, could be employed in the system without departing from the spirit of the invention or the scope of the accompanying claims.

The following is claimed:

1. A welding control system comprising an alternating current source of welding power, switch means for coupling said source to the work to be welded, means for creating a series of voltage pulses of the frequency of said source, pulse counting means, and means responsive to said pulse counting means for operating said switch means to apply welding power to the work after a preselected number of pulses and to remove welding power from the work after another preselected number of pulses, said switch means including three switches, the first of which when open cuts off welding power from the system, each of the other two of which, when the first switch is closed, connects the source of welding power to the work, said means responsive to said pulse counting means operating to successively close said first and second switches, after a preselected number of pulses to open said first switch and to open and lock out said second switch, after another preselected number of pulses to successively close said first and third switches and after another preselected number of pulses to open said first and third switches, whereby the first and succeeding welds may be effected at different predetermined heats.

2. A welding control system comprising in combination, a welding transformer, a source of power therefor, switches for connecting said source to said transformer, a source of voltage pulses, a set of like circuits successively energized and deenergized by pulses from said source and comprising a main counting chain, means operative when a preselected one of said circuits is energized to reset the chain for zero count, a second similar set of like circuits comprising a weld counting chain, means responsive to said last mentioned means for energizing a different and succeeding circuit of the weld counting chain upon each reset of the main counting chain, means automatically operative upon energization of a preselected one of the circuits of the weld counting chain to suppress application of pulses to the main counting chain, means responsive to energization of preselected earlier energized circuits of the main counting chain for closing and opening said switches for energization and deenergization of said welding transformer, said means operative to reset the main counting chain for zero count including a thyratron tube having its control grid normally biased to cut off and connected to two different preselected circuits of the main counting chain for removal of the bias upon energization of either of such circuits, relay means operative upon firing of said thyratron to open the circuits of the main counting chain for reset to zero count, the anode of said thyratron being capacitatively coupled to the weld counting chain to impress a control pulse thereon upon firing of said tube, second relay means operative when energized to open the connection between the control grid of said tube and the earlier energized one of said circuits and means operative only after said thyratron tube has fired for energizing said second relay means, whereby said thyratron is energized during the first successive energization of the circuits of the main counting chain at a lesser count number than during subsequent successive energizations of the circuits of the main counting chain.

3. The control system according to claim 2 including additional thyratron tubes each having a control grid connected to a different circuit of said main counting chain to be fired upon energization of the corresponding circuit, the firing of said additional tubes controlling said second relay means and controlling said switches for the delivery and cut-off of power to said transformer.

4. A welding control system comprising in combination, a source of power, a welding transformer including a primary winding having two input terminals, two switches, one switch being adapted when closed to connect said source of power to one input terminal and the other switch being adapted when closed to connect said source of power to the other input terminal, a third switch interposed between said power source and said two switches and adapted when open to prevent application of power to either input terminal of said transformer, a source of voltage pulses, a set of like circuits successively energized and deenergized by pulses from said source and comprising a main counting chain, means operative when a preselected one of said circuits is energized to reset the chain for zero count, a second similar set of like circuits comprising a weld counting chain, means responsive to said last mentioned means for energizing a different and succeeding circuit of said weld counting chain upon each reset of the main counting chain, a first, second and third thyratron each having a control grid normally biased to cut-off and connected to a different preselected one of the circuits of said main counting chain to be successively triggered during excursion through the chain, a relay connected to said first thyratron for energization therewith and controlling said third switch to cause closure thereof when energized, a pair of relays connected to said second thyratron for energization therewith, one of said pair of relays controlling one of said first mentioned switches to cause opening thereof when energized and the other of said pair of relays controlling a ground connection for the control grid of said third thyratron to cause opening thereof when energized, whereby during the first excursion through the main counting chain said third thyratron is continuously energized, a relay connected to said third thyratron for energization therewith and controlling the other of said two switches to cause opening thereof upon energization, means controlled by the relays connected to said second and third thyratrons for deenergizing said first thyratron upon change in condition of either said second or third thyratron, said means operative to reset the main counting chain to zero count being operative also to cause deenergization of said third thyratron whereby during the first excursion through the main counting chain power from said source is delivered to one of said transformer terminals from the time the first thyratron is triggered from the preselected circuit connected to its control grid until the second thyratron is triggered from the preselected circuit connected to its grid whereas during the second and succeeding excursions power is delivered to the other of said transformer terminals from the time the first thyratron is triggered unil the third thyratron is triggered.

5. A welding conrol system composing in combination, a welding transformer, a source of power therefor, switches for connecting said source to said transformer, a source of voltage pulses, a set of like circuits successively energized and deenergized by pulses from said source and comprising a main counting chain, means operative when a preselected one of said circuits is energized to reset the chain for zero count, a second similar set of like circuits comprising a weld counting chain, means responsive to said last mentioned means for energizing a different and succeeding circuit of the weld counting chain upon each reset of the main counting chain, means automatically operative upon energization of a preselected one of the circuits of the weld counting chain to suppress application of pulses to the main counting chain, and means responsive to energization of preselected earlier energized circuits of the main counting chain for closing and opening said switches for energization and deenergization of said welding transformer, said source of control pulses being a monostable multivibrator circuit triggered through a saturating transformer, a source of alternating energy for said transformer of the frequency of said power source for the welding transformer, means for delivering bias direct current to said saturating transformer and means for adjusting the magnitude of the bias current to adjust the timing of the created pulses with reference to the phase of said source whereby said switch means may be opened and closed when the current wave goes through zero.

6. The welding control system according to claim 5 wherein said means for delivering direct bias current to said saturating transformer and for adjusting the magnitude thereof comprises an adjustable auto-transformer connected across said last mentioned source, a transformer energized from said auto-transformer, and means for rectifying the output voltage of said last mentioned transformer and for delivering said rectified voltage to said saturating transformer.

References Cited in the file of this patent

UNITED STATES PATENTS

| | | |
|---|---|---|
| 2,412,092 | Mayle | Dec. 3, 1946 |
| 2,813,199 | Sciaky | Nov. 12, 1957 |
| 2,859,339 | Brady | Nov. 4, 1958 |